Aug. 22, 1939.　　　M. P. YOUKER　　　2,170,180
VAPOR PHASE FILTERING PROCESS FOR THE TREATMENT OF HYDROCARBON VAPORS
Filed Dec. 4, 1937　　2 Sheets-Sheet 1
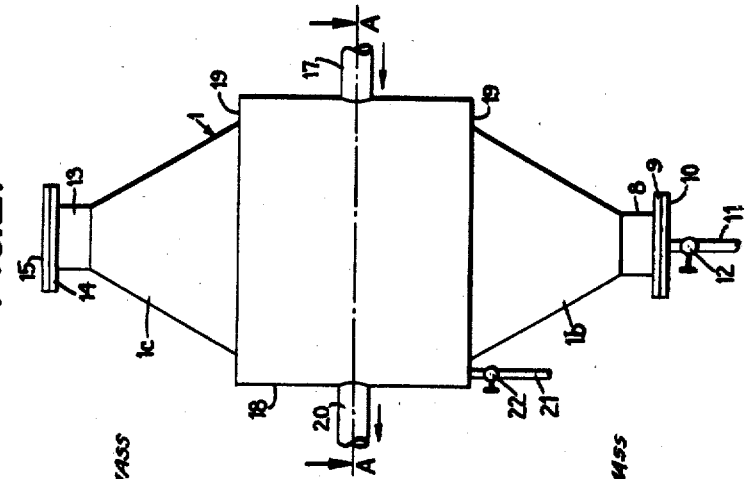
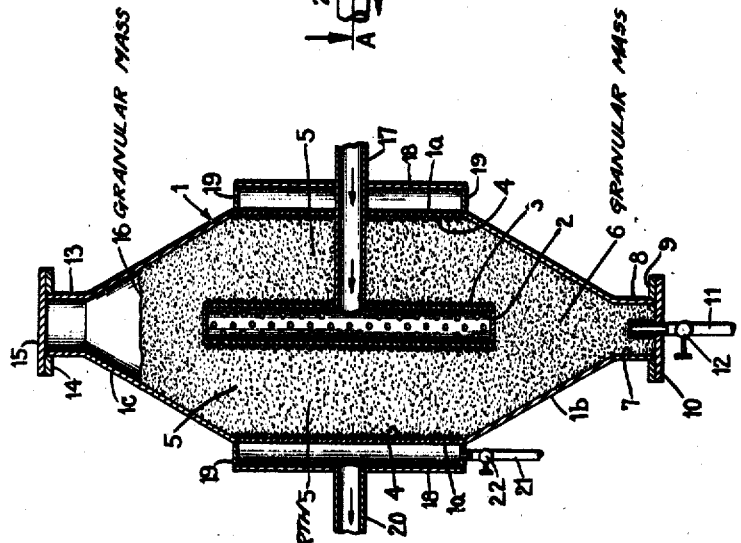
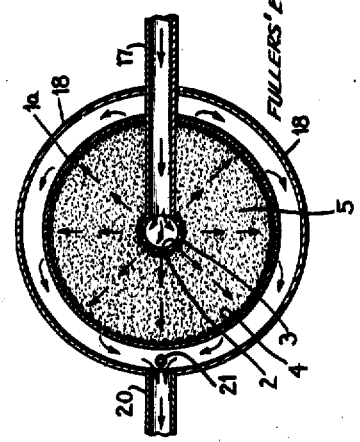
INVENTOR
MALCOLM P. YOUKER
BY
ATTORNEY

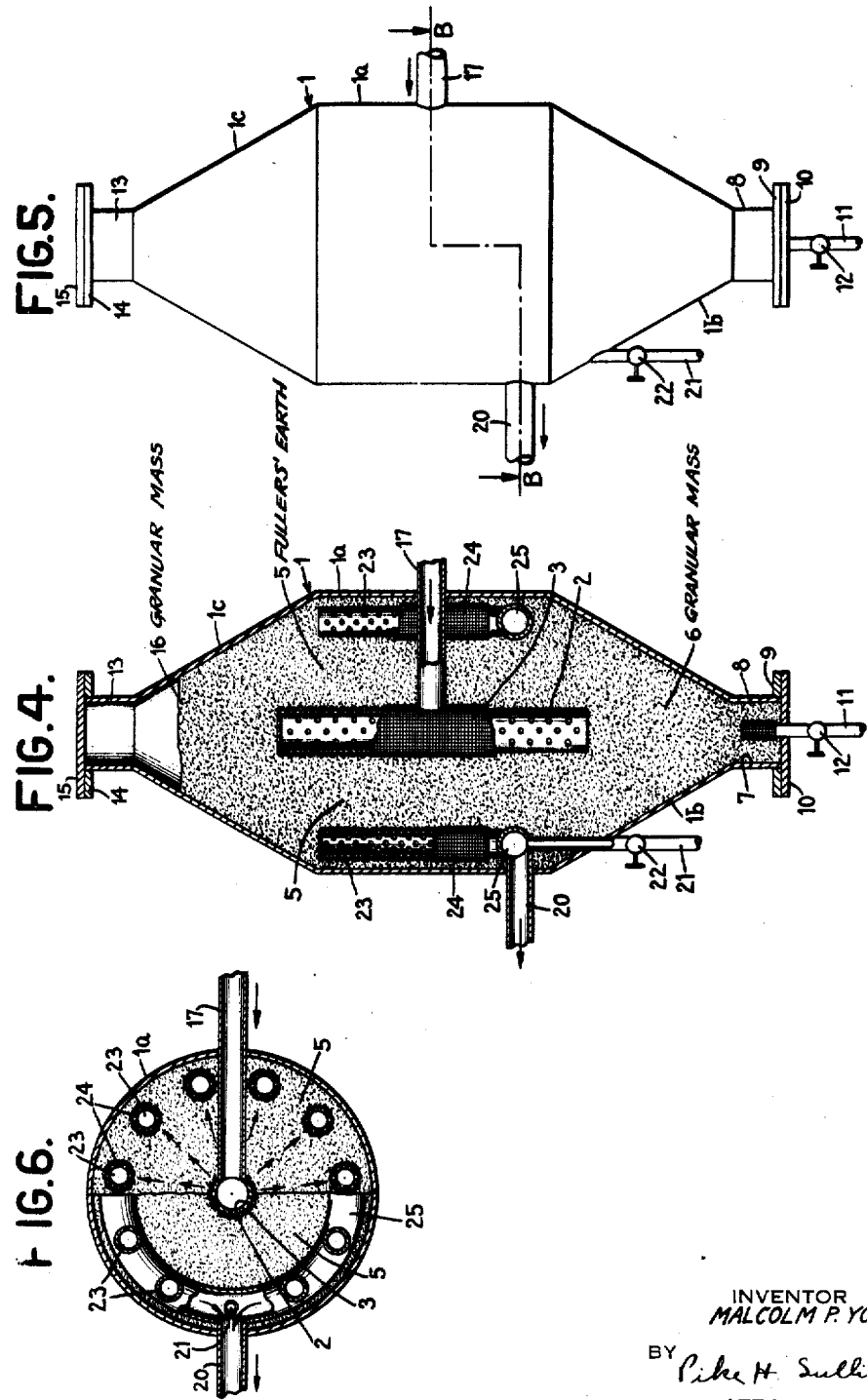

Patented Aug. 22, 1939

2,170,180

UNITED STATES PATENT OFFICE 2,170,180

VAPOR PHASE FILTERING PROCESS FOR THE TREATMENT OF HYDROCARBON VAPORS

Malcolm P. Youker, Bartlesville, Okla., assignor, by mesne assignments, to The Gray Processes Corporation, Jersey City, N. J., a corporation of Delaware Application December 4, 1937, Serial No. 178,035

6 Claims. (Cl. 196—96)

This invention relates to the treatment of hydrocarbon vapors to polymerize and remove gum-forming and other objectionable constituents therefrom by the passage of the vapors through a bed of fuller's earth or other equivalent material to effect the desired reactions.

The treatment of hydrocarbon vapors to effect polymerization reactions involves the formation of polymer products having boiling points substantially above that of the vapors being treated whereby the polymers are condensed and deposited as liquid on the surfaces of the catalytic material employed, e. g., fuller's earth. While the polymers so deposited are initially sufficiently liquid to flow out of the bed of catalytic material they become a source of substantially permanent deposits in the catalytic bed by being cracked with the formation of carbonaceous deposits and by being subjected to further polymerization with the formation of very viscous polymer products.

Various means, such as the continuous application of a solvent for the polymer products to the catalytic bed, have been employed to minimize the effect of the deposition of these polymers. However, it is found that in time the deposits caused by these polymers build up to a degree which impairs the efficiency of the catalyst bed sufficiently to require replacing it with fresh or revivified catalyst material.

It has been found that the distribution of the deposits which destroy the activity of the catalyst is concentrated in certain portions of the bed with the result that other portions are still sufficiently active for further use when replacement of the bed of catalyst is necessitated by the concentration of carbonaceous deposits elsewhere.

It is an object of the present invention to provide a method and an apparatus for the treatment of hydrocarbon vapors to effect polymerization of undesired constituents by subjecting them to contact with a bed of catalyst under conditions and in an arrangement whereby the deposition of polymer products is substantially uniform throughout the bed whereby the life of the catalyst bed is substantially lengthened in comparison with the results obtained under previous arrangements.

It is a further object of the invention to provide a method and apparatus for effecting contact of hydrocarbon vapors with a catalytic bed and condensation of a portion of the vapors within the bed to act as a solvent for the polymers deposited whereby the condensation of vapors and the deposition of polymers occur substantially uniformly in the catalyst body so that the uniformly distributed condensate assists in removing from the path of the vapors the uniformly deposited polymers by the downward flow of the two as a liquid mixture.

It is a further object of the invention to provide a method and apparatus wherein the vapors are passed uniformly through a catalyst bed so that all portions of the vaporous stream are subjected to the action of the catalyst bed to the same degree.

The invention contemplates the employment of a body of fuller's earth which is generally circular in cross section and cylindrical at least in part and arranged with the axis of the cylindrical portion substantially vertical. The invention contemplates the passage of hydrocarbon vapors through a body of catalytic material of this nature from the center of a cylindrical part of the body horizontally outwardly in all directions toward the periphery thereof and the collection and withdrawal of the treated vapors adjacent the periphery. To this end the body of fuller's earth is provided in a cylindrical part thereof with an elongated cavity which extends along the axis of said cylindrical part. This cavity preferably is generally cylindrical in shape and concentric with the said cylindrical part of the body of fuller's earth.

Means must be provided also for introducing the vapors to be treated directly into the said cavity without prior contact with the fuller's earth. This may be done by connecting with the cavity a conduit which extends to the outside of the body of fuller's earth horizontally from the face of the cavity or vertically from an end thereof. The central cavity in the body of fuller's earth is advantageously formed by the inclusion therein of a cylindrical metallic shell perforated uniformly in the curved face thereof. Uniform distribution of the vapors passing from this inner shell through the perforations into the body of fuller's earth may be promoted by associating with the inner shell a wire screen having a mesh size sufficiently small to prevent passage of the fuller's earth through the perforations into the shell and sufficiently large to avoid restricting the flow of the vapors. The screen is preferably wrapped tightly around the shell on the outer side thereof whereby the perforated surface is uniformly covered by the screen.

Collection means are arranged adjacent the periphery of the body of fuller's earth and horizontal to the perforated area of the inner shell to effect collection of the vapors uniformly in that peripheral area whereby the vapors are induced to pass horizontally in all directions through the body of fuller's earth from the perforated surface of the inner shell to the collection means at the periphery of the body of fuller's earth.

The body of fuller's earth is necessarily closed on the outside except for the exit means necessary for the said collection means by an outer shell which may take the shape of the body of fuller's earth and which completely surrounds the said body except for the said means for introducing the vapors into the inner shell and the said withdrawal means. In its preferred form the invention provides just below the area in which the vapors pass horizontally across the body of fuller's earth a consolidated granular mass of finely divided solid material which is integral with and substantialy coextensive horizontally with the body of fuller's earth through which the vapors pass. This granular mass is necessarily pervious to liquids formed from the vapors in the body of fuller's earth and must offer a specific resistance to the flow of the vapors at least equal to that of the portion of the body of fuller's earth through which the vapors pass in order to restrict the flow of the vapors to the desired channel while providing a means for withdrawing and collecting the liquids formed within the catalytic body. This granular mass may consist of any suitable material but conveniently it may consist of fuller's earth which may be identical with that employed for contact with the vapors.

The method and apparatus of the invention will be further described with specific reference to the accompanying drawings which illustrate the form of apparatus by which the new process may be carried out.

In the drawings Figures 1, 2 and 3 illustrate one form of apparatus for carrying out the method of the invention, Figure 1 being a vertical cross section through the center of this apparatus, Figure 2 being a side elevation of this apparatus and Figure 3 being a horizontal cross section taken through Figure 2 at A—A.

Another form of apparatus suitable for carrying out the method of the invention is illustrated in Figures 4, 5 and 6, Figure 4 being a vertical cross section through the center of the apparatus, Figure 5 being a vertical side elevation of the apparatus, and Figure 6 being a horizontal cross section taken through Figure 5 at B—B. The numerals have the same reference in all figures.

Referring to Figures 1, 2 and 3, vertically arranged shells 1 and 2 are provided, shell 2 being substantially cylindrical and arranged concentric with a cylindrical portion 1a of shell 1. The shell 2 is closed at the ends thereof and perforated uniformly in the curved surface thereof. The perforated surface of shell 2 is covered with a fine mesh wire screen 3 which is wrapped around shell 2. The peripheral surface of the cylindrical portion 1a of the shell 1 is uniformly perforated in a similar manner, and this perforated surface is likewise covered with a fine mesh wire screen 4 applied to the inner surface of the cylindrical portion 1a of shell 1.

It is to be understood that it is not necessary that shell 2 should be substantially coextensive vertically with the cylindrical portion 1a of shell 1 nor is it necessary that the entire curved surface of shell 1 and cylindrical portion 1a should be perforated. It is sufficient if only a horizontal section of shell 2 located within the cylindrical portion 1a of shell 1 is perforated in the peripheral area thereof. In this case the collection means such as the perforations in the cylindrical portion 1a of shell 1 are limited to that part of the cylindrical portion 1a which is substantially horizontal to the perforated section of shell 2. The requirements of the invention are satisfied if a perforated cylindrical shell vertically arranged is located within and concentric with a cylindrical outer shell which is provided with collection means uniformly distributed adjacent that area of the outer shell which is horizontal to the perforated surface of the inner shell. The shape and dimensions of the inner shell which extend if at all above or below the horizontal section thereof which is uniformly perforated in its peripheral area are unimportant so long as they are closed to prevent the passage of vapors from the interior of the inner shell into the interior of the outer shell except through the said perforations. Similarly, the shape and dimensions of any portion, if any, of the outer shell located above the said collection means in the area of the shell horizontal to the perforated surface of the inner shell are unimportant so long as they close the shell to the atmosphere and prevent passage of vapors from the interior of the outer shell except through said collection means.

Advantageously, the outer shell extends below the area occupied by the said collection means which are horizontal to the perforated area of the inner shell for a substantial distance. The shape of this extension of the outer shell is not necessarily cylindrical and conveniently is conical. Referring to Figures 1 and 2, this extension of shell 1 below the perforated cylindrical section 1a of shell 1 is provided by the addition of conical section 1b which extends for a substantial distance below the perforated area of shell 2.

A body of fuller's earth 5 is located in the space between the perforated face of shell 2 and the perforated cylindrical portion 1a of shell 1. This body of fuller's earth is supported within shell 1 by any suitable means, but preferably in accordance with the present invention the body of fuller's earth is supported upon a consolidated granular mass 6 of finely divided solid material which is in turn supported by conical section 1b of shell 1. The granular mass 6 may consist of any suitable material, but conveniently it consists of fuller's earth which may be substantially identical with that material which is horizontal to the perforated face of shell 2. In any case the granular mass 6 is substantially coextensive with the body of fuller's earth 5, is integral therewith, and offers a specific resistance to vapors at least equal to that of the body 5 of fuller's earth whereby the passage of vapors from the perforated surface of shell 2 to the perforated cylindrical section 1a of shell 1 is substantially restricted to the body of fuller's earth located between said perforated surfaces.

The conical shape of section 1b of shell 1 facilitates the withdrawal of the body of fuller's earth after exhaustion of the catalytic ability thereof through the horizontal circular opening 7 in the lower portion thereof which is provided by a cylindrical shell 8 attached to the conical section 1b. Shell 8 is provided with a flanged section 9 at the lower edge thereof, and a plate 10 is attached to said flanged section 9 to effect closure of the shell and provide a part of the support for the granular mass located in conical section 1b. The vessel formed by cylindrical section 8 and plate 10 is a convenient means for collecting liquids which are formed in the body 5 of fuller's earth and flow downwardly therethrough and downwardly through the granular mass 6. A pipe 11 provided with a valve 12 extends through plate 10 into the cylindrical part 7 within shell 1 to effect withdrawal of liquids collected therein during the treatment of the vapors. The end of pipe 11 within section 8 is suitably closed and perforated and if desired covered with fine mesh screen to permit passage of liquids into pipe 11 while excluding the particles of solid material constituting granular mass 6. It is to be understood, of course, that the location of pipe 11 as shown is not essential, this pipe being located suitably in any position where it projects into the granular mass 6 at a substantial distance from the top thereof to effect drainage of liquids obtained therein.

The shell 1 need not extend appreciably above the perforated base of shell 2 for the purposes of the present invention. However, in order to facilitate filling shell 1 with fuller's earth a conical section 1c is provided integral with cylindrical section 1a at the upper edge thereof. Conical section 1c is provided at the upper portion with a cylindrical section 13 provided with a flanged edge 14 to which is fastened a closure plate 15. With this construction it is necessary to maintain a substantial mass 16 of consolidated granular material above the bed 5 of fuller's earth located between the perforated surfaces of shell 1 and shell 2 and integral and coextensive therewith in order to prevent by-passing of the vapors around the said fuller's earth body. Conveniently this consolidated granular material may be fuller's earth identical with that constituting the body 5.

The vapors to be treated are introduced into the interior of shell 2 from the exterior of shell 1 without prior contact with the fuller's earth body 5. This may be provided for by connecting the interior of shell 2 with the exterior of shell 1 by means of a pipe which extends through shell 1 and connects with a suitable opening in the surface of shell 2. This may be done by extending shell 2 upwardly or downwardly through an end of shell 1. However, in the form of shell 1 illustrated this disposition of shell 2 would interfere with the introduction and removal of fuller's earth. Consequently, it is preferable in the particular form illustrated to provide a pipe 17 which connects with a suitable opening of equivalent diameter in the surface of shell 2 horizontally through shell 1 whereby the vapors may be passed by means not shown through pipe 17 into the interior of shell 2. It is evident that a plurality of such pipes may be employed without departing from the invention.

The collection of vapors withdrawn through the perforated surface of shell 1 is accomplished in the particular construction illustrated in Figures 1, 2 and 3 by the provision of a cylinder 18 larger in diameter than the cylindrical portion 1a of shell 1 concentric therewith and coextensive vertically with the perforated area of shell 1. The resulting annular space between cylinder 18 and cylindrical section 1a is closed at the top and bottom by horizontal plates 19. Access to the annular space inside cylinder 18 is provided by pipe 20 which connects therewith for withdrawal of vapors which pass through the perforations in cylinder 1 in shell 1 and into the said annular space. Provision for the withdrawal of liquids formed in the said annular space is made by the insertion of a pipe 21, provided with a valve 22, which extends through a bottom plate 19.

The apparatus for carrying out the method of the invention shown in Figures 4, 5 and 6 is substantially like that shown in Figures 1, 2 and 3 except for the provision of a different means for effecting means for effecting withdrawal of vapors from the interior of shell 1 at the periphery thereof. In this particular construction shell 1 is not perforated as in Figures 1, 2 and 3, and instead of cylinder 18 there is provided a plurality of perforated pipes 23 which are arranged vertically within shell 1 adjacent the periphery of cylindrical section 1a. The pipes 23 are provided with perforations sufficiently large to facilitate passage of the vapors into the interior thereof and may be provided with fine wire mesh screens 24 wrapped around each pipe 23 to prevent the fuller's earth from passing into the interior of pipes 23.

Pipes 23 are arranged close together around the inner wall of cylindrical section 1a of shell 1 and are substantially coextensive vertically with shell 2 whereby withdrawal of vapors from that portion of the body of fuller's earth 5 adjacent the periphery of cylindrical section 1a and horizontal to the perforated face of shell 2 is substantially uniform and whereby concentration of vapors at all points adjacent the periphery of cylindrical section 1a and horizontal to and equidistant from the perforated face of shell 2 is substantially uniform.

The pipes 23 are mounted on and connected to the interior of a circular pipe header 25 which is horizontally disposed within shell 1 in such manner that the pipes 23 are held in position adjacent the wall of cylindrical section 1a of shell 1. Provision for withdrawing vapors from the header pipe 25 is made by extending pipe 20 through the wall of shell 1 and connecting it to header 25. In this construction drain pipe 21 extends upwardly through conical section 1b and connects with header 25 to effect withdrawal of liquids condensed within pipes 23 or header 25.

In carrying out the method of the present invention hydrocarbon vapors which are to be treated are caused to flow through pipe 17 into shell 2 thence through the perforations in the surface of shell 2 and thence horizontally through the body 5 of fuller's earth through the perforations in the wall of shell 1 as in the example shown in Figure 1 or through the perforations in pipes 23 as in the example shown in Figure 4. After passing through the perforations in the wall of shell 1 as in Figure 1 the vapors pass through the annular space between cylinder 18 and cylindrical section 1a and outwardly therefrom through pipe 20. After passing through the perforations in pipes 23 as in Figure 4 the vapors pass through pipes 23 into header 20 and from there outwardly through pipe 20. Condensate which is formed in the said annular space or within pipes 23 and header 25 is withdrawn through pipe 21.

In passing through the fuller's earth the polymerization of gum-forming compounds and other undesirable constituents of the hydrocarbon vapors is effected with the formation of high boiling polymer products which condense within the body 5 of fuller's earth. This polymer condensate will tend to flow downwardly through the body 5 of fuller's earth and the granular mass 6 and collect in the cylindrical section 8 of shell 1 whence it is withdrawn through pipe 11.

Due to the uniform withdrawal of the vapors from substantially all points adjacent the periphery of the bed of fuller's earth horizontal to the perforated face of shell 2 the vapors as they pass horizontally through the bed 5 of fuller's earth from center to outside encounter a path of constantly increasing cross section. This results in a substantially uniformly decreasing velocity of the vapors as they pass through the body of fuller's earth. By this arrangement the most active of the undesirable polymerizable constituents are quickly polymerized in the area of high velocity adjacent shell 2, and the vapors at the same time pass quickly out of the area wherein such easily formed polymers are disposed and into contact with relatively fresh catalyst. By the time the vapors reach the latter portion of the passage through the reaction zone the constituents most susceptible to polymerization have been removed, and the velocity of the vapors and their concentration is considerably decreased whereby they are subjected to the catalytic action of relatively fresh catalyst for the relatively long period of time necessary to effect polymerization of the last remaining undesired constituents. This promotes a more uniform distribution of polymers throughout the treating zone whereby the life of the catalytic bed is lengthened.

Furthermore, this operation is particularly advantageous where it is desired to effect a reduction in temperature of the vapors as they pass through the bed since under this arrangement the vapors are subjected to the action of the catalyst for a length of time which varies inversely as the temperature. This tends to correct the uneven rate of formation of polymers which would accompany constant decrease in temperature of the vapors in prior methods of treating hydrocarbon vapors by means of fuller's earth or equivalent material.

In accordance with the present invention it is preferred to fractionate the vapors prior to their treatment according to the present invention to include therein constituents higher boiling than are desired in the finished product and to control the temperature of the bed of fuller's earth whereby there is a gradient outwardly from the center to the periphery thereof from the temperature which will cause incipient condensation from the vapors as they enter to a temperature at the periphery of the bed of fuller's earth which will effect condensation of the lowest boiling constituents undesired in the final product. When this modification is employed the constantly decreasing velocity of the vapors in their passage through the bed of fuller's earth wherein they encounter substantially lower temperatures results in substantially uniform condensation of high boiling constituents from the vapors throughout the bed of fuller's earth through which the vapors pass. This uniform condensation of high boiling constituents accompanying a uniform deposition of polymers facilitates the removal of said polymers from the path of the vapors by downward flow as a liquid mixture of polymers and condensate. In this manner uniform production of condensate within the catalyst bed assists in preventing the formation of carbonaceous deposits from the polymers deposited in the said bed.

This desirable result may be obtained even though it is undesired to include the said higher boiling constituents in the vapors. For example, the vaporous stream consisting substantially entirely of gasoline constituents may be treated at temperatures which will effect condensation of the higher boiling constituents thereof within the bed of fuller's earth which condensate will be withdrawn from the apparatus at the lower portion thereof as a mixture of condensate and polymers. This may be subsequently redistilled to separate the gasoline contained therein which may be combined with the gasoline withdrawn from the treating chamber as vapors to produce a product of desired boiling range.

When carrying out the invention in accordance with the preferred modification it may be desirable to leave the outer surface of the cylindrical portion of shell 1 as in Figure 2 or the outer surface of cylinder 18 as in Figure 1 exposed to the atmosphere to effect the desired withdrawal of heat therefrom. However, it may be desirable to insulate the conical sections 1b and 1c to maintain uniformity of temperature within the fuller's earth bed 5. In the form of apparatus shown in Fig. 4 some insulation may be required around the cylindrical portion thereof even though condensation is desired.

In the normal procedure according to the present invention gasoline vapors will be delivered through the apparatus at from 250° to 350° F. at atmospheric pressure. However, good results may be obtained by maintaining superatmospheric pressure on the vapors passing through the bed of fuller's earth and delivering such vapors through the fuller's earth body at temperatures even above 400° F. Numerous units of the apparatus described may be utilized in series, and the flow through several units may be alternately reversed, the flow through any individual unit being continued, however, in the same direction, provided proper piping manifold leading to and from the units is provided. For example, two units may be used in series, and the order of flow of vapors through the two units may be alternately reversed and the fuller's earth may be renewed alternately to conserve this material.

The hydrocarbon vapors treated in the new process may be derived from any source such as for instance the top of a fractionating column and after treatment may be delivered to any form of condenser.

The method and apparatus of the present invention have been described in detail with reference to specific embodiments. It is to be understood, however, that the invention is not limited by such specific reference but is broader in scope and capable of other embodiments than those specifically described and illustrated in the drawing. This application is a continuation-in-part of prior application Serial No. 712,837, filed February 24, 1934.

I claim:

1. The method of treating hydrocarbon vapors to polymerize and remove gum-forming and other objectionable constituents therefrom which comprises maintaining a body of fuller's earth, generally circular in cross-section, cylindrical at least in part, arranged with its axis substantially vertical, and provided with an elongated cavity generally circular in cross-section located at least in part within said cylindrical part and concentric therewith, introducing said vapors into said cavity without substantial prior contact with said body, passing said vapors horizontally into said body from said cavity at a multiplicity of points uniformly distributed in the periphery of at least a section of said cavity within said cylindrical part whereby distribution of said vapors in that part of said body horizontally adjacent said multiplicity of points is substantially uniform, withdrawing said vapors from said body at a multiplicity of points uniformly distributed adjacent the periphery of at least a section of said cylindrical part thereof and horizontal to said first-mentioned multiplicity of points whereby distribution of said vapors in that portion of the body adjacent said second-mentioned multiplicity of points is substantially uniform, and whereby said vapors pass horizontally across said body from said cavity to said periphery to effect substantially uniform concentration of vapors at all points of said body horizontally equidistant from the axis thereof and between said multiplicities of points, and whereby said vapors pass through said body at substantially uniformly decreasing velocity to effect substantially uniform deposition of polymers in said body in the path of said vapors, and removing liquid formed in said body from the lower portion thereof.

2. The method of treating hydrocarbon vapors to polymerize and remove gum-forming and other objectionable constituents therefrom which comprises maintaining a body of fuller's earth, generally circular in cross-section, cylindrical at least in part, arranged with its axis substantially vertical, and provided with an elongated cavity generally circular in cross-section located at least in part within said cylindrical part and concentric therewith, introducing said vapors into said cavity without substantial prior contact with said body, passing said vapors horizontally into said body from said cavity at a multiplicity of points uniformly distributed in the periphery of at least a section of said cavity within said cylindrical part whereby distribution of said vapors in that part of said body horizontally adjacent said multiplicity of points is substantially uniform, withdrawing said vapors from said body at a multiplicity of points uniformly distributed in the periphery of at least a section of said cylindrical part thereof and horizontal to said first-mentioned multiplicity of points whereby distribution of said vapors in that portion of the body adjacent said second-mentioned multiplicity of points is substantially uniform, and whereby said vapors pass horizontally across said body from said cavity to said periphery to effect substantially uniform concentration of vapors at all points of said body horizontally equidistant from the axis thereof and between said multiplicities of points, and whereby said vapors pass through said body at substantially uniformly decreasing velocity to effect substantially uniform deposition of polymers in said body in the path of said vapors, and removing liquid formed in said body from the lower portion thereof.

3. The method of treating hydrocarbon vapors to polymerize and remove gum-forming and other objectionable constituents therefrom which comprises maintaining a body of fuller's earth, generally circular in cross-section, cylindrical at least in part, arranged with its axis substantially vertical, and provided with an elongated cavity generally circular in cross-section located at least in part within said cylindrical part and concentric therewith, introducing said vapors into said cavity without substantial prior contact with said body, passing said vapors horizontally into said body from said cavity at a multiplicity of points uniformly distributed in the periphery of at least a section of said cavity within said cylindrical part whereby distribution of said vapors in that part of said body horizontally adjacent said multiplicity of points is substantially uniform, withdrawing said vapors from said body at a multiplicity of points uniformly distributed adjacent the periphery of at least a section of said cylindrical part thereof and horizontal to said first-mentioned multiplicity of points whereby distribution of said vapors in that portion of the body adjacent said second-mentioned multiplicity of points is substantially uniform, and whereby said vapors pass horizontally across said body from said cavity to said periphery to effect substantially uniform concentration of vapors at all points of said body horizontally equidistant from the axis thereof and between said multiplicities of points, and whereby said vapors pass through said body at substantially uniformly decreasing velocity to effect substantially uniform deposition of polymers in said body in the path of said vapors, maintaining immediately below that portion of said body between said multiplicities of points and integral and substantially coextensive horizontally with said body a consolidated granular mass of finely divided solid material pervious to liquids formed from said vapors in said body and offering a specific resistance to the flow of said vapors at least equal to that of the portion of said body between said multiplicities of points, permitting liquids formed in said body to flow downwardly through said granular mass, and collecting said liquids at the lower boundary of said mass.

4. The method of treating hydrocarbon vapors to polymerize and remove gum-forming and other objectionable constituents therefrom which comprises maintaining a body of fuller's earth, generally circular in cross-section, cylindrical at least in part, arranged with its axis substantially vertical, and provided with an elongated cavity generally circular in cross-section located at least in part within said cylindrical part and concentric therewith, introducing said vapors into said cavity without substantial prior contact with said body, passing said vapors horizontally into said body from said cavity at a multiplicity of points uniformly distributed in the periphery of at least a section of said cavity within said cylindrical part whereby distribution of said vapors in that part of said body horizontally adjacent said multiplicity of points is substantially uniform, withdrawing said vapors from said body at a multiplicity of points uniformly distributed adjacent the periphery of at least a section of said cylindrical part thereof and horizontal to said first-mentioned multiplicity of points whereby distribution of said vapors in that portion of the body adjacent said second-mentioned multiplicity of points is substantially uniform, and whereby said vapors pass horizontally across said body from said cavity to said periphery to effect substantially uniform concentration of vapors at all points of said body horizontally equidistant from the axis thereof and between said multiplicities of points, and whereby said vapors pass through said body at substantially uniformly decreasing velocity to effect substantially uniform deposition of polymers in said body in the path of said vapors, removing liquid formed in said body from the lower portion thereof, and maintaining the temperature at said periphery substantially lower than that of said vapors in said cavity whereby condensation of vapors occurs substantially uniformly in the portion of said body between said multiplicities of points, and whereby said uniformly distributed condensate assists in removing from the path of said vapors said uniformly deposited polymers by downward flow as a liquid mixture therewith.

5. Apparatus for treating hydrocarbon vapors to polymerize and remove gum-forming and other objectionable constituents therefrom which comprises an outer shell which is cylindrical at least in part and arranged with its axis substantially vertical, top and bottom closure means for said outer shell, an inner shell located at least in part within a cylindrical part of said outer shell substantially above the bottom thereof, said inner shell being substantially smaller than said outer shell in horizontal cross-section, generally cylindrical, concentric with a surrounding cylindrical portion of said outer shell, perforated uniformly about the periphery thereof in at least a horizontal section thereof located within a cylindrical part of said outer shell and substantially above the bottom thereof, the interiors of said shells being non-connected except through said perforations, means located at the periphery of said outer shell for collecting vapors within said outer shell substantially uniformly from all parts within said outer shell adjacent the periphery thereof and horizontal to the perforated area of said inner shell, means cooperative with said collecting means for withdrawing from said outer shell vapors so collected, a body of fuller's earth supported within said outer shell around said inner shell, said body being at least coextensive with said perforated surface and said collecting means and uniformly annular in horizontal cross-section therebetween, a consolidated granular mass of finely divided solid material located immediately below the area horizontal to the perforated face of said inner shell and substantially integral and coextensive with said body of fuller's earth, said granular mass being pervious to liquids formed within said body of fuller's earth and having a specific resistance to the flow of vapors therethrough at least equal to that of said body of fuller's earth, means other than said perforations for introducing said vapors into said inner shell, and means located adjacent the lower portion of said granular mass for collecting and withdrawing from said outer shell liquids formed in said body of fuller's earth.

6. Apparatus for treating hydrocarbon vapors to polymerize and remove gum-forming and other objectionable constituents therefrom which comprises an outer shell which is cylindrical at least in part, arranged with its axis substantially vertical, and perforated uniformly in a horizontal section extending around the periphery of a cylindrical part thereof and spaced a substantial distance from the bottom of said shell, closure means for the top and bottom of said shell, an inner shell located at least in part within a cylindrical part of said outer shell substantially above the bottom thereof, substantially smaller in horizontal cross section than and concentric with said outer shell, extending the length of the axis of said perforated section of said outer shell, and perforated uniformly in the surface thereof generally horizontal to said perforated section of said outer shell, said perforations in said inner shell constituting the sole communication between the interior thereof and the exterior thereof within said outer shell, a body of fuller's earth supported within said outer shell between said perforated surfaces, at least coextensive therewith, and uniformly annular in cross section between said perforated surfaces, a consolidated granular mass of finely divided solid material located immediately below the area between said perforated surfaces and substantially integral and coextensive with said body of fuller's earth, said granular mass being pervious to liquids formed within said body of fuller's earth and having a specific resistance to the flow of vapors therethrough at least equal to that of said body of fuller's earth, means other than the said perforations therein for introducing said vapors into said inner shell, means cooperative with said perforations in said outer shell for withdrawing and collecting vapors from said outer shell, and means located adjacent the lower portion of said granular mass for collecting and withdrawing from said outer shell liquids formed in said body of fuller's earth.

MALCOLM P. YOUKER.

CERTIFICATE OF CORRECTION.

Patent No. 2,170,180.            August 22, 1939.

MALCOLM P. YOUKER.

It is hereby certified that the above numbered patent was erroneously issued to "The Gray Processes Corporation, of Jersey City, New Jersey, a corporation of Delaware, as assignee by mesne assignments, whereas said patent should have been issued to Phillips Petroleum Company, of Bartlesville, Oklahoma, a corporation of Delaware, as shown by the record of assignments in this office; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.

posited polymers by downward flow as a liquid mixture therewith.

5. Apparatus for treating hydrocarbon vapors to polymerize and remove gum-forming and other objectionable constituents therefrom which comprises an outer shell which is cylindrical at least in part and arranged with its axis substantially vertical, top and bottom closure means for said outer shell, an inner shell located at least in part within a cylindrical part of said outer shell substantially above the bottom thereof, said inner shell being substantially smaller than said outer shell in horizontal cross-section, generally cylindrical, concentric with a surrounding cylindrical portion of said outer shell, perforated uniformly about the periphery thereof in at least a horizontal section thereof located within a cylindrical part of said outer shell and substantially above the bottom thereof, the interiors of said shells being non-connected except through said perforations, means located at the periphery of said outer shell for collecting vapors within said outer shell substantially uniformly from all parts within said outer shell adjacent the periphery thereof and horizontal to the perforated area of said inner shell, means cooperative with said collecting means for withdrawing from said outer shell vapors so collected, a body of fuller's earth supported within said outer shell around said inner shell, said body being at least coextensive with said perforated surface and said collecting means and uniformly annular in horizontal cross-section therebetween, a consolidated granular mass of finely divided solid material located immediately below the area horizontal to the perforated face of said inner shell and substantially integral and coextensive with said body of fuller's earth, said granular mass being pervious to liquids formed within said body of fuller's earth and having a specific resistance to the flow of vapors therethrough at least equal to that of said body of fuller's earth, means other than said perforations for introducing said vapors into said inner shell, and means located adjacent the lower portion of said granular mass for collecting and withdrawing from said outer shell liquids formed in said body of fuller's earth.

6. Apparatus for treating hydrocarbon vapors to polymerize and remove gum-forming and other objectionable constituents therefrom which comprises an outer shell which is cylindrical at least in part, arranged with its axis substantially vertical, and perforated uniformly in a horizontal section extending around the periphery of a cylindrical part thereof and spaced a substantial distance from the bottom of said shell, closure means for the top and bottom of said shell, an inner shell located at least in part within a cylindrical part of said outer shell substantially above the bottom thereof, substantially smaller in horizontal cross section than and concentric with said outer shell, extending the length of the axis of said perforated section of said outer shell, and perforated uniformly in the surface thereof generally horizontal to said perforated section of said outer shell, said perforations in said inner shell constituting the sole communication between the interior thereof and the exterior thereof within said outer shell, a body of fuller's earth supported within said outer shell between said perforated surfaces, at least coextensive therewith, and uniformly annular in cross section between said perforated surfaces, a consolidated granular mass of finely divided solid material located immediately below the area between said perforated surfaces and substantially integral and coextensive with said body of fuller's earth, said granular mass being pervious to liquids formed within said body of fuller's earth and having a specific resistance to the flow of vapors therethrough at least equal to that of said body of fuller's earth, means other than the said perforations therein for introducing said vapors into said inner shell, means cooperative with said perforations in said outer shell for withdrawing and collecting vapors from said outer shell, and means located adjacent the lower portion of said granular mass for collecting and withdrawing from said outer shell liquids formed in said body of fuller's earth.

MALCOLM P. YOUKER.

CERTIFICATE OF CORRECTION.

Patent No. 2,170,180.     August 22, 1939.

MALCOLM P. YOUKER.

It is hereby certified that the above numbered patent was erroneously issued to "The Gray Processes Corporation, of Jersey City, New Jersey, a corporation of Delaware, as assignee by mesne assignments, whereas said patent should have been issued to Phillips Petroleum Company, of Bartlesville, Oklahoma, a corporation of Delaware, as shown by the record of assignments in this office; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.